United States Patent
Wen (10) Patent No.: US 10,684,826 B2
(45) Date of Patent: Jun. 16, 2020

(54) METHOD AND DEVICE FOR PAGE RENDERING AND VALIDATION

(71) Applicant: Guangzhou UC Network Technology Co., Ltd., Guangzhou (CN)

(72) Inventor: Wentian Wen, Guangzhou (CN)

(73) Assignee: GUANGZHOU UC NETWORK TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 15/894,317

(22) Filed: Feb. 12, 2018

(65) Prior Publication Data
US 2018/0232212 A1     Aug. 16, 2018

(30) Foreign Application Priority Data
Feb. 10, 2017 (CN) .......................... 2017 1 0072998

(51) Int. Cl.
| | | |
|---|---|---|
| *G06F 11/36* | (2006.01) | |
| *G06F 8/30* | (2018.01) | |
| *G06F 8/71* | (2018.01) | |
| *G06F 16/23* | (2019.01) | |
| *G06F 16/957* | (2019.01) | |

(52) U.S. Cl.
CPC .............. *G06F 8/315* (2013.01); *G06F 8/71* (2013.01); *G06F 11/362* (2013.01); *G06F 16/2365* (2019.01); *G06F 16/9574* (2019.01)

(58) Field of Classification Search
CPC ..... G06F 17/30876–30899; G06F 11/36–3696
See application file for complete search history.

(56) References Cited

U.S. PATENT DOCUMENTS

| | | | | |
|---|---|---|---|---|
| 7,451,393 B1 * | 11/2008 | Herbison | .............. | G06F 16/972 715/234 |
| 7,784,026 B1 * | 8/2010 | Wong | ...................... | G06F 9/454 717/109 |
| 8,181,156 B1 * | 5/2012 | Bobykin | .............. | G06F 16/958 717/120 |
| 8,719,693 B2 * | 5/2014 | Borean | ................... | G06F 16/88 715/234 |
| 10,114,811 B2 * | 10/2018 | Kludy | .................. | G06F 40/174 |
| 2002/0046099 A1 * | 4/2002 | Frengut | ................. | G06Q 30/02 705/14.52 |

(Continued)

*Primary Examiner* — Matthew J Brophy
(74) *Attorney, Agent, or Firm* — Alston & Bird LLP (57) ABSTRACT

The present invention provides a method and device for page rendering and validation. The method includes at least: extracting a general business configuration and a derivative business configuration based on similarities and differences between an initial business page and a derivative business page; encapsulating the general business configuration, and at the same time, separating respective attribute logic and validation logic from one or more derivative business configurations and then encapsulating them separately, in which the encapsulation of general business and the encapsulation of derivative business are respectively saved into corresponding page configuration files; according to a derivative business type selected by the user, the corresponding page configuration file being loaded to a page configuration file of general business, and a form validation method being bound to the page configuration file of general business.

10 Claims, 2 Drawing Sheets

(56) References Cited

U.S. PATENT DOCUMENTS

| | | | | |
|---|---|---|---|---|
| 2003/0078949 | A1* | 4/2003 | Scholz | G06F 40/174 |
| | | | | 715/226 |
| 2004/0168122 | A1* | 8/2004 | Kobipalayam Murugaiyan | |
| | | | | G06F 16/958 |
| | | | | 715/234 |
| 2006/0287920 | A1* | 12/2006 | Perkins | G06Q 30/02 |
| | | | | 705/14.49 |
| 2007/0192678 | A1* | 8/2007 | Tang | G06F 40/174 |
| | | | | 715/234 |
| 2008/0082572 | A1* | 4/2008 | Ballard | G06F 3/0484 |
| 2014/0344232 | A1* | 11/2014 | Kludy | G06F 40/174 |
| | | | | 707/694 |
| 2015/0121199 | A1* | 4/2015 | Wu | G06F 16/986 |
| | | | | 715/239 |
| 2015/0370813 | A1* | 12/2015 | Kumar Sivaramamurthy | |
| | | | | G06F 16/958 |
| | | | | 707/755 |
| 2016/0062954 | A1* | 3/2016 | Ruff | G06F 40/106 |
| | | | | 715/249 |
| 2016/0299888 | A1* | 10/2016 | Wu | G06F 16/958 |
| 2016/0359791 | A1* | 12/2016 | Zhang | H04L 51/20 |
| 2017/0041310 | A1* | 2/2017 | Li | H04W 12/06 |
| 2017/0205973 | A1* | 7/2017 | Somaiya | G06F 16/9577 |

* cited by examiner

METHOD AND DEVICE FOR PAGE RENDERING AND VALIDATION

CROSS-REFERENCE TO RELATED APPLICATION

The present invention claims priority to and benefit of Chinese Patent Application No. 201710072998.X, filed with the State Intellectual Property Office (SIPO) of the People's Republic of China on Feb. 10, 2017, the entire content of which is incorporated by reference into the present application.

TECHNICAL FIELD

The present invention relates to the field of information processing technologies, and in particular, to a method and device for page rendering and validation.

BACKGROUND ART

In the process in which the initial business page evolves continuously according to different business scenarios, the development of the page often needs to make certain adjustments corresponding to a specific business. There are some minor differences between each derivative business besides the common general configuration. These relatively small differences are not big enough to trigger the condition of changing the derivative business into an independent business. In this regard, in a development, the rendering of the difference of a derivative business and the entering of validation logic are frequently added to the initial business page. As a result, the JavaScript of the page becomes too bloated, and may compromise subsequent debugging and maintenance.

However, in contrast with the above development approach, if each derivative business independently generates and maintains its derivative business page rendering and input validation logic, it will generate a large number of duplicate codes. As a result, when changing certain common business configurations, a number of files need to be modified, which frequently generates missing or other errors, and meanwhile it will also result in much more workload for testing many repetitive features.

SUMMARY OF INVENTION

One object of the present invention is to provide a method and a device for rendering and validating a page, so as to improve the technical issues mentioned above.

One or more embodiments of the present invention provide a method for rendering and validating a page, which includes the following steps:

S1) extracting a general business configuration and a derivative business configuration based on similarities and differences between an initial business page and a derivative business page;

S2) encapsulating the general business configuration, and at the same time, separating respective attribute logic and validation logic from one or more derivative business configurations and then encapsulating them separately, wherein the encapsulation of general business and the encapsulation of derivative business are respectively saved into corresponding page configuration files, and each derivative business corresponds to a page configuration file;

S3) according to a derivative business type selected by the user, the corresponding page configuration file being loaded to a page configuration file of general business, and a form validation method being bound to the page configuration file of general business;

S4) during a rendering process, general business data being first loaded and then derivative business data being loaded; when the page is submitted, the general business Preferably, in step S1, the same business data between the initial business page and the derivative business page are extracted to be general business configuration data, and the business data of the derivative business page different from the initial business page are extracted to be derivative business configuration data.

Preferably, in step S2, the general business configuration is encapsulated in a $ (document).ready initialization method, and the initialization method along with the general business configuration information are stored in a first page configuration file, the attribute logic of a derivative business configuration is encapsulated in a $(document).ready method, the validation logic of the derivative business configuration is encapsulated in a jQuery.validation validation method, and the attribute logic information of the derivative business configuration and the initialization method thereof, the validation logic information of the derivative business configuration and the validation method thereof are saved in a second page configuration file; and in the case that there are a plurality of derivative businesses, the attribute logic information and the initialization method, as well as the validation logic information and the validation method thereof of each derivative business configuration are saved in a corresponding page configuration file in the foregoing way.

Preferably, in step S3, use a page tag language to determine the derivative business type selected by the user, load the corresponding page configuration file into the general business page configuration file according to different derivative business types, and bind the form validation method to a form submission button in the general business page configuration file, wherein the form validation method executes the validation logic of the derivative business configuration after completion of general business data validation.

Preferably, in step S4, first load the initialization method saved in the page configuration file of the general business, and then execute the initialization method saved in the page configuration file of the derivative business, first validate the validity of the general business data when the page is submitted, and then validate the validity of a corresponding derivative business data using the validation method saved in the page configuration file of the derivative business loaded to the page configuration file of the general business.

The present invention further provides a device for rendering and validating a page, which comprises:

a business configuration extracting unit, which is configured for extracting a general business configuration and a derivative business configuration based on similarities and differences between an initial business page and a derivative business page;

an encapsulating and saving unit, which is configured for encapsulating the general business configuration, and at the same time, separating respective attribute logic and validation logic from one or more derivative business configurations and then encapsulating them separately, wherein the encapsulation of general business and the encapsulation of derivative business are respectively saved into corresponding page configuration files, and each derivative business corresponds to a page configuration file;

a loading and binding unit, which is configured for according to a derivative business type selected by the user, the corresponding page configuration file being loaded to a page configuration file of general business, and a form validation method being bound to the page configuration file of general business;

a rendering and validating unit, which is configured for during a rendering process, general business data being first loaded and then derivative business data being loaded; when the page is submitted, the general business data being first validated and the then the derived business data being validated.

Preferably, the business configuration extracting unit is configured for extracting the same business data between the initial business page and the derivative business page to be general business configuration data, and extracting the business data of the derivative business page different from the initial business page to be derivative business configuration data.

Preferably, the encapsulating and saving unit is configured for encapsulating the general business configuration in a $ (document).ready initialization method, saving the initialization method along with the general business configuration information in a first page configuration file, encapsulating the attribute logic of a derivative business configuration in a $(document).ready method, encapsulating the validation logic of the derivative business configuration in a jQuery.validation validation method, in addition saving the attribute logic information of the derivative business configuration and the initialization method thereof, the validation logic information of the derivative business configuration and the validation method thereof in a second page configuration file; and in the case that there are a plurality of derivative businesses, the attribute logic information and the initialization method, as well as the validation logic information and the validation method thereof of each derivative business configuration are saved in a corresponding page configuration file in the foregoing way.

Preferably, the loading and binding unit is configured for using a page tag language to determine the derivative business type selected by the user, loading the corresponding page configuration file into the general business page configuration file according to different derivative business types, and binding the form validation method to a form submission button in the general business page configuration file, wherein the form validation method executes the validation logic of the derivative business configuration after completion of general business data validation.

Preferably, the rendering and validating unit is configured for first loading the initialization method saved in the page configuration file of the general business, and then executing the initialization method saved in the page configuration file of the derivative business, as well as first validating the validity of the general business data when the page is submitted, and then validating the validity of a corresponding derivative business data using the validation method saved in the page configuration file of the derivative business loaded to the page configuration file of the general business.

According to the method and device for page rendering and validation according to the present invention, the general business and the derivative business are separated and the attribute logic and the validation logic are separated so as to solve the following problems:

1. It is able to avoid that the multi-party business logics are integrated on the same page in a multiplexed solution of derivative business, thus is beneficial to subsequent personnel maintenance.

2. It is able to avoid that a large number of duplicate codes between corresponding business pages in the independent solutions of various derivative businesses, as well as avoid easy omission when modifying common attributes, so as to reduce the cumbersome testing tasks to be conducted by testing personnel.

3. It is able to avoid that the html and JavaScript codes finally outputted to the browser are too bloated, thus is beneficial to the debugging process by program developers.

DESCRIPTION OF EMBODIMENTS

The technical solution of the embodiments of the present invention will be clearly and completely described below with reference to the embodiments of the present invention and the accompanying drawings. Apparently, the described embodiments of the present invention are merely some but not all of the embodiments of the present invention. The components of the embodiments of the present invention, generally described and illustrated in the figures herein, may be arranged and designed in a wide variety of different configurations. Accordingly, the following detailed description of the embodiments of the present invention provided in the accompanying drawings is not intended to limit the protection scope of the present invention, but merely to describe certain selected embodiments of the present invention. All other embodiments obtained by a person skilled in the art based on the embodiments of the present invention without inventive skills shall fall within the protection scope of the present invention.

Figure 1:
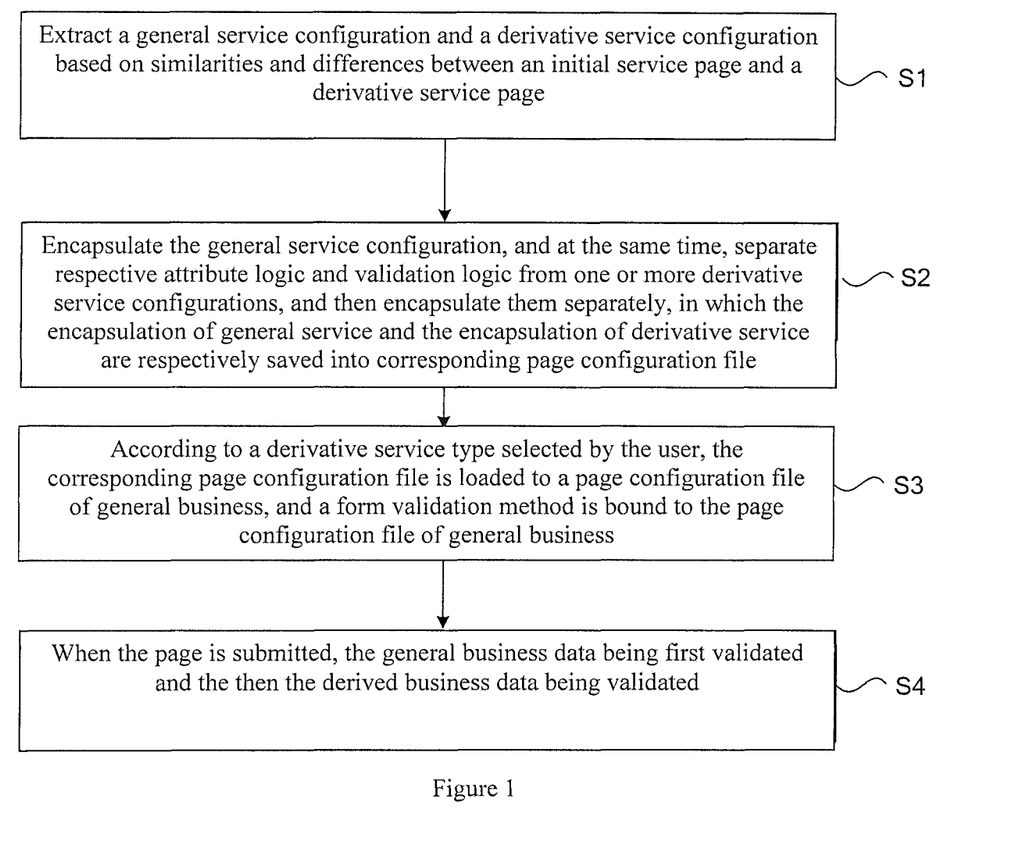
FIG. 1 is a flow chart of a method for rendering and validating a page provided in the present invention.

FIG. 1 is a flow chart of a method for rendering and validating a page provided in the present invention. As shown in FIG. 1, the method for rendering and validating a page according to the present invention includes the following steps:

S1) extracting a general business configuration and a derivative business configuration based on similarities and differences between an initial business page and a derivative business page.

Application developers often make version upgrades to their applications. In addition to fixing bugs, these applications, in many cases, are able to provide more new functions to the applications. In this way, the page of the initial version and the page of the upgraded version with certain extended functions have certain common contents and some different contents. Accordingly, the first step of the method provided in one or more embodiments of the present invention is to extract the general business configuration and the derivative business configuration based on the similarities and differences between the initial business page and the derivative business page. Specifically, the same business data between the initial business page and the derivative business page are extracted as the general business configuration data, and the business data for which the derivative business page is different from the initial business page are also extracted as the derivative business configuration data.

The foregoing step will be described in detail through a specific example.

The initial version provided the following initial businesses: ordinary message push, and the push need to fill in the contents are as follows:

Message style, message channel, direct download of application message, application, whether the application is silently downloaded, effective starting time, effective ending time, pure image upload, message name, main title, message body, sub-title, effective time, anti-interference time, push content type, jump type, designated return page, launch channel, client version, reservation of push time.

The upgraded version launches derivative businesses based on the initial business, the derivative business launches certain new features: special news: population for special new delivery; configuration derived from a derivative business: targeted population news: targeted population for delivery crowd, release settings; targeted user message: upload population files, is there a pop-up window. That is, the upgraded version needs to include the business configuration resulted from the derived business in addition to the content that the initial business needs to fill in.

In this way, for the business page rendering of the new version, first, the same business data between the initial business page and the derivative business page need to be extracted as the general business configuration data, and the business data of the derivative business page that is different from the initial business page is further extracted as the derivative business configuration data.

S2) Encapsulating the general business configuration, and at the same time, separating respective attribute logic and validation logic from one or more derivative business configurations and then encapsulating them separately, wherein the encapsulation of general business and the encapsulation of derivative business are respectively saved into corresponding page configuration files, and each derivative business corresponds to a page configuration file.

Specifically, the general business configuration is encapsulated in a $(document).ready initialization method of jQuery, and the initialization method along with the general business configuration information are stored in a first page configuration file; in addition, the attribute logic of a derivative business configuration is encapsulated in a $(document).ready method of jQuery, the validation logic of the derivative business configuration is encapsulated in a jQuery.validation validation method, and the attribute logic information of the derivative business configuration and the initialization method thereof, the validation logic information of the derivative business configuration and the validation method thereof are saved in a second page configuration file; furthermore, and in the case that there are a plurality of derivative businesses, the attribute logic information and the initialization method, as well as the validation logic information and the validation method thereof of each derivative business configuration are saved in a corresponding page configuration file in the foregoing way.

In addition, each of these derivative businesses have a flag when it is created or edited to indicate the type of business thereof, so that in the case of multiple derivative business, it is easier to identify which derivative business to perform in a subsequent operation.

In the foregoing step, $(document).ready initializes the general business data that need to be initialized, for example, in a process of configuration, the application text box needs to conduct a fuzzy query based on the application name entered by an operator to find out a list of related applications. The initiation of this control element has finished its encapsulation in the general $ (document).ready. This initialization method is stored in a page configuration file together with the general business configuration data, for example, a page configuration file named create.html. Similarly, $(document).ready is also able to initialize the attribute data that need to be initiated of a derivative business, and validate the validation logic of the derivative business with a validation method. In this way, the attribute logic information of the derivative business configuration and the initialization method thereof, the validation logic information of the derivative business configuration and the validation method thereof are saved together in a page configuration file, for example, a page configuration file named spice.html.

Due to the fact that the difference between a field needed by a derivative business and that needed by a general business, as well as the difference between the fields of different businesses can be quite significant, the general business data and derived business data need to be encapsulated separately. In addition, each derived business also needs to be individually encapsulated with a corresponding $(document).ready initiation method and jQuery.validation validation method; and the encapsulation of each derived business is then saved in a corresponding page configuration file. For example, assume that there are 3 derived businesses, in accordance with the method mentioned above, these 3 derivatives are encapsulated separately, and the encapsulation (including attribute logic information and a initialization method thereof, validation logic information and a validation method thereof) of each derivative business is saved in a corresponding page configuration file, there are three different page configuration files in total, that is, each derivative business corresponds to a page configuration file.

S3) According to a derivative business type selected by the user, the corresponding page configuration file being loaded to a page configuration file of general business, and a form validation method being bound to the page configuration file of general business.

In the foregoing step, a page tag language is used to determine the derivative business type selected by the user, and then according to different derived business types, a corresponding page configuration file is loaded into the general business page configuration file, in addition, a form validation method is bound to a form submission button in the general business page configuration file, where the form validation method executes the validation logic of the derivative business configuration after completion of general business data validation.

Specifically, each derivative business has a marker at the time of creating and editing to describe its type of business, a user can click on a corresponding derivative business as needed, for example, the delivery of a messages of a specific topic mentioned previously, the background can use a page tag language (such as jsp, struts, spring, Groovy, and the like) to determine the type of derivative business selected by the user, and then load the page configuration file (for example, spice.html) corresponding to the specific type of derivative business into the general business page configuration file (for example, create.html); in addition, a form validation method (such as the validateForm method) is bound to a form submission button in the general business page configuration file, and the form validation method will be used in the subsequent validation step to first process the validation of general business data (such as date validation), and after pass the validation of general business data, the validation method is then executed. Because the validation method in the page configuration file of the derivative business loaded into the page configuration file of the general business redefines the validation method in the page configuration file of the general business, the foregoing step is to execute the validation logic of the derivative business configuration.

The following description uses a simple example to describe how to implement the validation logic of the derivative business configuration after completion of the validation of the general business data.

The validateForm( ) and spiceValidation( ) are saved in the page configuration file create.html of the general business, while the spiceValidation( ) saved in create.html is an empty function that does not perform anything, the specific validation is performed by validateForm( ), in addition, after the validation has been passed, execute to call spiceValidation( ), for example, as shown in the following pseudocode:

The ValidateForm validation method saved in the create.html of general business:

```
function validateForm( ) {
//validate general business logic, if the validation is not passed,
directly return false, and do not go to execute spiceValidation//
        return spiceValidation( );
    }
    The validation method (spiceValidation( )) saved in spice.html
of derivative business:
        function spiceValidation( ) {
        //process a validation specific for the derivative business, and then
return a Boolean value result//
            return true;
        }
```

By loading spice.html into the tail of create.html using a page tag language, the code for the validation method saved in the page configuration file of the derivative business is stored in create.html, hence the actual html code outputted to the browser is as follows:

```
function validateForm( ) {
//validate general business logic, if the validation is not passed,
directly return false, and do not go to execute spiceValidation//
        return spiceValidation( );
    }
    function spiceValidation( ) {
    // This code is tag language import//
    // process a validation specific for the derivative business, and then
return a Boolean value result//
        return true;
    }
```

According to the characteristics of a browser, the customized validation of different derivative businesses can be achieved.

S4) During a rendering process, general business data being first loaded and then derivative business data being loaded; when the page is submitted, the general business data being first validated and the then the derived business data being validated.

In the foregoing step, first load the initialization method saved in the page configuration file of the general business, and then execute the initialization method saved in the page configuration file of the derivative business, first validate the validity of the general business data when the page is submitted, and then validate the validity of a corresponding derivative business data using the validation method saved in the page configuration file of the derivative business loaded to the page configuration file of the general business.

Specifically, by virtue of the feature that JavaScript scripts can be executed on multiple places of a page, when rendering a page, first load the $(document).ready initialization method saved in the page configuration file of the general business, and after finishing execution on the bottom of the page, further execute the $(document).ready initialization method saved in the page configuration file of the divertive business, so as to achieve the customized rendering of the page.

Data validation is required when submitting a page, thus first validate the validity of the general business data and then validate the validity of the derivative business data. For example, as described in the exemplary description of the simple example provided above, in a validation process, the bound form validation method (for example, validateForm method) first validates the validity of the general business data (such as validate the date validity), and after confirms the validity in the foregoing validation process, the validation method will be executed. Because the validation method in the page configuration file (such as spice.html) of the derivative business loaded to the page configuration file of the general business redefines the validation method in the page configuration file of the general business, the foregoing step is to execute the validation of the derivative business data, thereby achieving the aim of executing different validations for different derivative businesses. As shown in the previous example, execute the validateForm ( ) in create.html, and after completion of validation of general business data, execute return spiceValidation( ), and call the function spiceValidation( ) in the spice.html file loaded to create.html. In this way, the present invention is able to achieve when submitting a page, first perform the validation of general business data, and then perform the validation of derivative business data.

After exacting a plurality of derivative businesses from the derivative business page, according to the description of the relevant steps provided above, the background determines the type of derivative business clicked and thus selected by the user, accordingly, when return html to the browser, the spice.html of corresponding derivative business is imported according to the tag of the specific type of derivative business. That is, only one spice.html is imported into the tail of create.html, and the spice.htmls of different derivative business are mutually exclusive to each other, so even if a large number of derivative businesses are extracted from the derivative business page, because only one spice.html is imported into the tail of create.html at a time, the validation of multiple derivative businesses will not conflict to each other.

According to the page rendering and validation method provided in the present invention, the general business and derivative business are separated, the attribute logic and validation logic are also separated, the general business data is first loaded in a rendering process, and then the derivative business data is loaded, the general business data is first validated, and then the derivative business data is validated. In this way, it is able to avoid that the multi-party business logics are integrated on the same page in a multiplexed solution of derivative business, avoid that a large number of duplicate codes between corresponding business pages in the independent solutions of various derivative businesses, as well as avoid that the html and JavaScript codes finally outputted to the browser are too bloated, thus is beneficial to subsequent personnel maintenance, to debugging process by program developers, and reduces the cumbersome testing tasks to be conducted by testing personnel.

Figure 2:
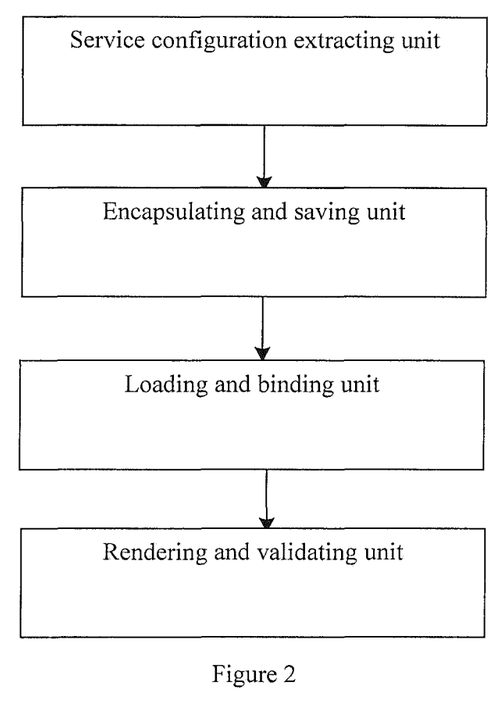
FIG. 2 is a schematic block diagram of the device for rendering and validating a page provided in the present invention.

FIG. 2 is a schematic block diagram of the device for rendering and validating a page provided in the present invention. As shown in FIG. 2, the device for rendering and validating a page provided in the present invention includes:

a business configuration extracting unit, which is configured for extracting a general business configuration and a derivative business configuration based on similarities and differences between an initial business page and a derivative business page;

an encapsulating and saving unit, which is configured for encapsulating the general business configuration, and at the same time, separating respective attribute logic and validation logic from one or more derivative business configurations and then encapsulating them separately, wherein the encapsulation of general business and the encapsulation of derivative business are respectively saved into corresponding page configuration files, and each derivative business corresponds to a page configuration file;

a loading and binding unit, which is configured for according to a derivative business type selected by the user, the corresponding page configuration file being loaded to a page configuration file of general business, and a form validation method being bound to the page configuration file of general business;

a rendering and validating unit, which is configured for during a rendering process, general business data being first loaded and then derivative business data being loaded; when the page is submitted, the general business data being first validated and the then the derived business data being validated.

Preferably, the business configuration extracting unit is configured for extracting the same business data between the initial business page and the derivative business page to be general business configuration data, and extracting the business data of the derivative business page different from the initial business page to be derivative business configuration data.

Preferably, the encapsulating and saving unit is configured for encapsulating the general business configuration in a $ (document).ready initialization method, saving the initialization method along with the general business configuration information in a first page configuration file, encapsulating the attribute logic of a derivative business configuration in a $(document).ready method, encapsulating the validation logic of the derivative business configuration in a jQuery.validation validation method, in addition saving the attribute logic information of the derivative business configuration and the initialization method thereof, the validation logic information of the derivative business configuration and the validation method thereof in a second page configuration file; and in the case that there are a plurality of derivative businesses, the attribute logic information and the initialization method, as well as the validation logic information and the validation method thereof of each derivative business configuration are saved in a corresponding page configuration file in the foregoing way.

Preferably, the loading and binding unit is configured for using a page tag language to determine the derivative business type selected by the user, loading the corresponding page configuration file into the general business page configuration file according to different derivative business types, and binding the form validation method to a faint submission button in the general business page configuration file, wherein the form validation method executes the validation logic of the derivative business configuration after completion of general business data validation.

Preferably, the rendering and validating unit is configured for first loading the initialization method saved in the page configuration file of the general business, and then executing the initialization method saved in the page configuration file of the derivative business, as well as first validating the validity of the general business data when the page is submitted, and then validating the validity of a corresponding derivative business data using the validation method saved in the page configuration file of the derivative business loaded to the page configuration file of the general business.

A person of ordinary skill in the art can clearly understand that, for the convenience and simplicity of description, reference may be made to the corresponding processes in the method embodiments provided previously for the specific working process of the device described above. The examples provided in the previous method embodiments may also apply to explain the working process of the device, which will not be repeated herein.

According to the page rendering and validation device provided in the present invention, the general business and derivative business are separated, the attribute logic and validation logic are also separated, the general business data is first loaded in a rendering process, and then the derivative business data is loaded, the general business data is first validated, and then the derivative business data is validated. In this way, it is able to avoid that the multi-party business logics are integrated on the same page in a multiplexed solution of derivative business, avoid that a large number of duplicate codes between corresponding business pages in the independent solutions of various derivative businesses, as well as avoid that the html and JavaScript codes finally outputted to the browser are too bloated, thus is beneficial to subsequent personnel maintenance, to debugging process by program developers, and reduces the cumbersome testing tasks to be conducted by testing personnel.

The computer program product of the method for page rendering and validation provided in the embodiments of the present invention includes a computer readable storage medium storing program code, where the program code includes instructions for executing the method described in the foregoing method embodiments. For a specific implementation of the present invention, reference may be made to the method embodiments provided above, and details are not described herein again.

The functions, if implemented in the form of software functional units and sold or used as separate products, may be stored in a computer-readable storage medium. Based on this understanding, the technical solution of the present invention essentially, or a part contributing to the prior art, or a part of the technical solution of the present invention may be embodied in the form of a software product stored in a storage medium, including the instructions that are used to enable a computer device (which may be a personal computer, a tablet, a smart phone, a server, or a network device) to execute all or part of the steps of the method according to each embodiment of the present invention. The foregoing storage medium includes various media capable of storing program code, such as a USB flash memory, a removable hard disk, a read only memory (ROM), a random access memory (RAM), a magnetic disk, an optical disk, and the like.

The foregoing descriptions are merely a few specific embodiments of the present invention, and the protection scope of the present invention is not limited thereto. Anyone skilled in the art may easily conceive of changes and substitutions within the technical scope disclosed in the present invention, which should be encompassed within the protection scope of the present invention. Therefore, the protection scope of the present invention should be defined by the scope of the claims.

What is claimed is:

1. A method for rendering and validating a page, comprising:
   S1) extracting a general business configuration and one or more derivative business configurations based on similarities and differences between an initial business page and a derivative business page, comprising:
      extracting same business data between the initial business page and the derivative business page as general business data in the general business configuration, and
      extracting business data of the derivative business page that is different from business data of the initial business page as derivative business data in the one or more derivative business configurations;
   S2) encapsulating the general business configuration, separating respective attribute logic of the one or more derivative business configurations from respective validation logic of the one or more derivative business configurations, encapsulating the respective attribute logic of the one or more derivative business configurations separately from encapsulating the respective validation logic of the one or more derivative business configurations, saving the encapsulation of general business configuration and the encapsulation of one or more derivative business configurations respectively into corresponding page configuration files, wherein each of the one or more derivative business configurations corresponds to one of the page configuration files;
   S3) in response to determining a user selection of a derivative business type via a user interface, loading a corresponding page configuration file of derivative business to a page configuration file of general business according to the derivative business type and bounding a form validation method comprising a validation method of the corresponding page configuration file of derivative business to the page configuration file of general business; and
   S4) during a rendering process, loading general business data and, subsequent to loading the general business data, loading the derivative business data, and, when submitting the page, validating the general business data and, subsequent to validating the general business data, validating the derivative business data.

2. The method according to claim 1, wherein step S2 further comprises:
   encapsulating the general business configuration in a $(document).ready initialization method, and storing the initialization method along with information related to the general business configuration in a first page configuration file,
   encapsulating the attribute logic of a derivative business configuration in a $(document).ready method, encapsulating the validation logic of the derivative business configuration in a jQuery.validation validation method, and saving information related to the attribute logic of the derivative business configuration and the initialization method thereof, information related to the validation logic of the derivative business configuration and the validation method thereof in a second page configuration file, and
   in the case that there are a plurality of derivative businesses, saving information related to the attribute logic and the initialization method, as well as information related to the validation logic and the validation method thereof of each derivative business configuration in a corresponding page configuration file in the foregoing way.

3. The method according to claim 2, wherein step S3 further comprises:
   using a page tag language to determine the derivative business type selected by the user,
   loading the corresponding page configuration file into the page configuration file of general business according to different derivative business types, and
   binding the form validation method to a form submission button in the page configuration file of general business, wherein the form validation method executes the validation logic of the derivative business configuration after completion of general business data validation.

4. The method according to claim 3, wherein step S4 further comprises loading the initialization method saved in the page configuration file of the general business configuration, and, subsequent to loading the initialization method, executing the initialization method saved in the page configuration file of the derivative business configuration, and, when submitting the page, validating the general business data, and, subsequent to validating the general business data, validating a corresponding derivative business data using the validation method saved in the page configuration file of the derivative business loaded to the page configuration file of the general business configuration.

5. A device for rendering and validating a page, comprising
   a business configuration extracting unit, which is configured for extracting a general business configuration and one or more derivative business configurations based on similarities and differences between an initial business page and a derivative business page, wherein the business configuration extracting unit is further configured for:
      extracting same business data between the initial business page and the derivative business page as general business data in the general business configuration, and
      extracting business data of the derivative business page that is different from business data of the initial business page as derivative business data in the one or more derivative business configurations;
   an encapsulating and saving unit, which is configured for encapsulating the general business configuration, separating respective attribute logic of the one or more derivative business configurations from respective validation logic of the one or more derivative business configurations, encapsulating the respective attribute logic of the one or more derivative business configurations separately from encapsulating the respective validation logic of the one or more derivative business configurations, saving the encapsulation of general business configuration and the encapsulation of one or more derivative business configurations respectively into corresponding page configuration files, wherein each of the one or more derivative business configurations corresponds to one of the page configuration files;

a loading and binding unit, which is configured for, in response to determining a user selection of a derivative business type via a user interface, loading a corresponding page configuration file of derivative business to a page configuration file of general business according to the derivative business type and bounding a form validation method comprising a validation method of the corresponding page configuration file of derivative business to the page configuration file of general business; and a rendering and validating unit, which is configured for, during a rendering process, loading general business data and, subsequent to loading the general business data, loading derivative business data; when submitting the page, validating the general business data and, subsequent to validating the general business data, validating the derivative business data.

6. The device according to claim 5, wherein the encapsulating and saving unit is configured for:

encapsulating the general business configuration in a $(document).ready initialization method, saving the initialization method along with information related to the general business configuration in a first page configuration file, encapsulating the attribute logic of a derivative business configuration in a $(document).ready method, encapsulating the validation logic of the derivative business configuration in a jQuery.validation validation method, and saving information related to the attribute logic of the derivative business configuration and the initialization method thereof, information related to the validation logic of the derivative business configuration and the validation method thereof in a second page configuration file, and in the case that there are a plurality of derivative businesses, saving information related to the attribute logic and the initialization method, as well as information related to the validation logic and the validation method thereof of each derivative business configuration in a corresponding page configuration file in the foregoing way.

7. The device according to claim 6, wherein the loading and binding unit is configured for:

using a page tag language to determine the derivative business type selected by the user, loading the corresponding page configuration file into the page configuration file of general business according to different derivative business types, and binding the form validation method to a form submission button in the page configuration file of general business, wherein the form validation method executes the validation logic of the derivative business configuration after completion of general business data validation.

8. The device according to claim 7, wherein the rendering and validating unit is configured for loading the initialization method saved in the page configuration file of the general business configuration, and, subsequent to loading the initialization method, executing the initialization method saved in the page configuration file of the derivative business configuration, as well as validating the general business data when the page is submitted, and subsequent to validating the general business data, validating a corresponding derivative business data using the validation method saved in the page configuration file of the derivative business loaded to the page configuration file of the general business configuration.

9. The method according to claim 1, wherein the derivative business type associated with the user selection is targeted news, wherein a corresponding derivative business configuration of the derivative business type comprises business data indicating whether there is a pop-up window, wherein the business data indicating whether there is the pop-up window is different from the business data of the initial business page.

10. The device according to claim 5, wherein the derivative business type associated with the user selection is targeted news, wherein a corresponding derivative business configuration of the derivative business type comprises business data indicating whether there is a pop-up window, wherein the business data indicating whether there is the pop-up window is different from the business data of the initial business page.

* * * * *